(12) United States Patent
Callen

(10) Patent No.: US 6,557,092 B1
(45) Date of Patent: Apr. 29, 2003

(54) PROGRAMMABLE ALU

(76) Inventor: Greg S. Callen, 1443 W. Park Ave., Anaheim, CA (US) 92801

( * ) Notice: Subject to any disclaimer, the term of this patent is extended or adjusted under 35 U.S.C. 154(b) by 0 days.

(21) Appl. No.: 09/280,247

(22) Filed: Mar. 29, 1999

(51) Int. Cl.[7] ................................................. G06F 9/00
(52) U.S. Cl. .............................. 712/37; 712/42; 326/38
(58) Field of Search .............................. 326/38, 40, 39, 326/46; 712/15, 13, 37, 42

(56) References Cited

U.S. PATENT DOCUMENTS

| | | | |
|---|---|---|---|
| 4,233,667 A | 11/1980 | Devine et al. ............... | 364/900 |
| 4,323,981 A | 4/1982 | Nakamura ................... | 364/749 |
| 4,874,164 A | 10/1989 | Miner et al. .................... | 273/1 |
| 5,122,685 A | 6/1992 | Chan et al. ............... | 307/465.1 |
| 5,227,989 A | 7/1993 | Jones, Jr. et al. ............ | 364/716 |
| 5,227,993 A | 7/1993 | Yamakawa ................ | 364/746.2 |
| 5,345,410 A | 9/1994 | Yokoyama ................... | 364/746 |
| 5,394,030 A | 2/1995 | Jennings, III et al. ......... | 326/41 |
| 5,398,198 A | 3/1995 | Mahant-Shetti et al. .... | 364/716 |
| 5,457,644 A | 10/1995 | McCollum ................... | 364/716 |
| 5,742,180 A * | 4/1998 | DeHon et al. ................. | 326/40 |
| 5,752,035 A * | 5/1998 | Trimberger .................. | 395/705 |
| 5,812,437 A | 9/1998 | Purcell et al. .......... | 364/724.17 |
| 5,956,518 A * | 9/1999 | DeHon et al. ................. | 712/15 |
| 6,282,627 B1 * | 8/2001 | Wong et al. ................... | 712/15 |
| 6,353,841 B1 * | 3/2002 | Marshall et al. ............. | 708/232 |

* cited by examiner

Primary Examiner—Larry D. Donaghue
(74) Attorney, Agent, or Firm—Rutan & Tucker, LLP; Robert D. Fish; David J. Zoetewey

(57) ABSTRACT

A programmable arithmetic and logic unit (ALU) comprising a plurality of data selectors, the data selectors having corresponding data input lines; a plurality of ALU function input lines wherein the number of ALU function input lines is equal to the number of data input lines on each of the data selectors, and each ALU function input line corresponds to one data input line on each of the data selectors; wherein each of the data input lines of each of the data selectors is connected to the corresponding data input lines of each of the other data selectors and to the corresponding ALU function input line.

16 Claims, 5 Drawing Sheets

FIG. 1
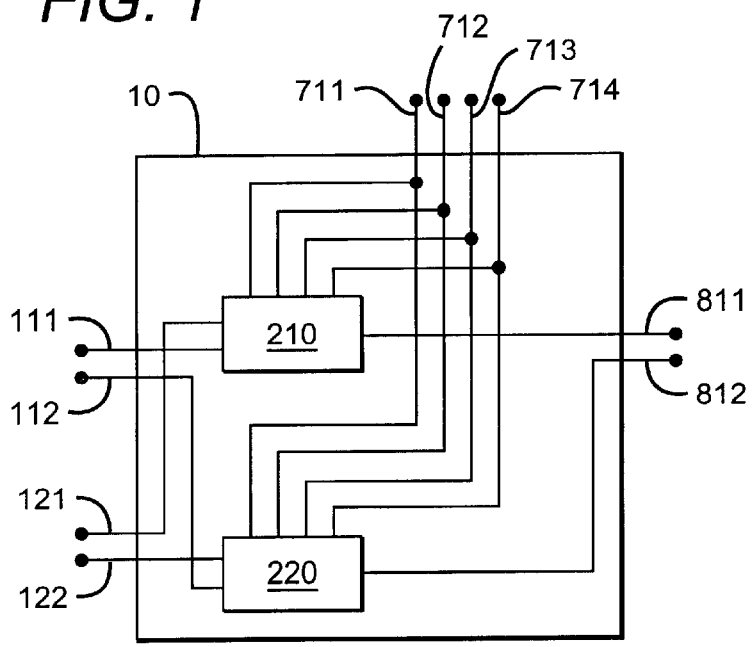
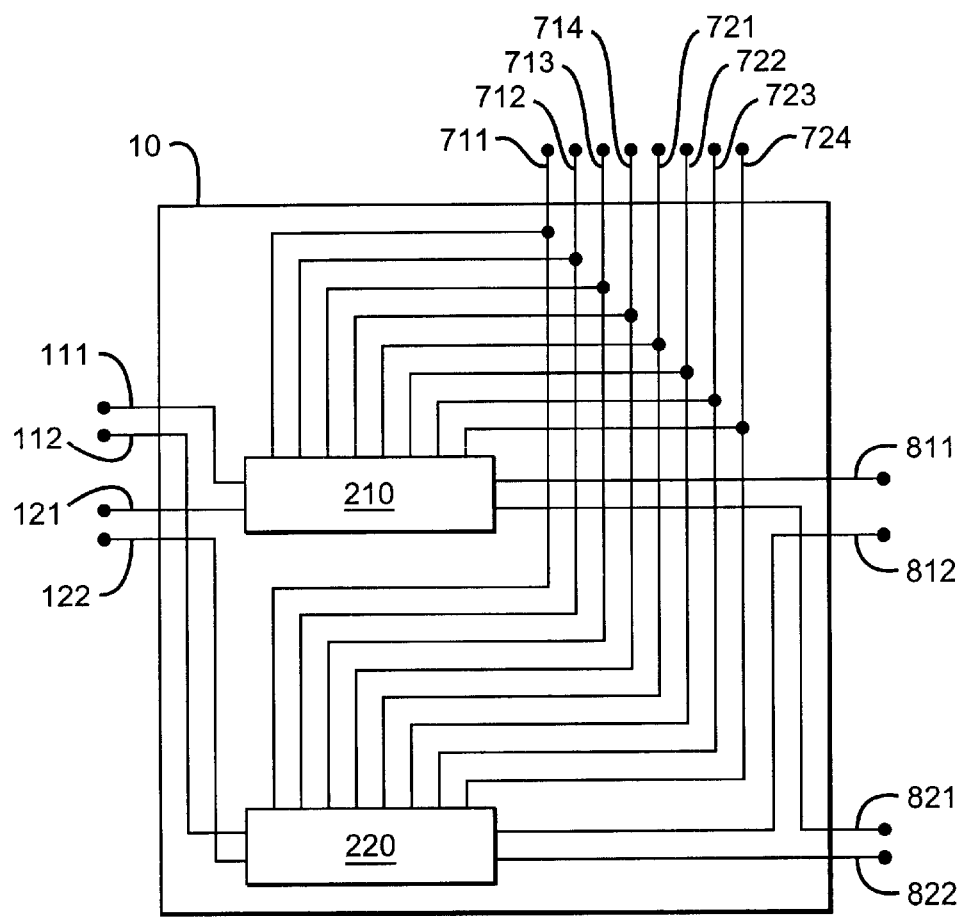
FIG. 2

US 6,557,092 B1

PROGRAMMABLE ALU

FIELD OF THE INVENTION

The field of the invention is digital electronics.

BACKGROUND OF THE INVENTION

Implementation of complicated Boolean expressions can be accomplished by a number of methods utilizing one or more integrated circuits (ICs). One such method involves the use of numerous AND-OR logic or NAND combinational logic circuits. Another method involves the use of specialized ICs such as Programmable Logic Array (PLA) devices. Yet another method involves using a data selector where the data inputs of the data selector have logic levels corresponding to the output column of a truth table defining the function to be implemented, and where the data select values of the data selector have logic values corresponding to the input values of the function. Another method, similar to the use of a data selector, involves the use of a memory device to act as a look up table (LUT) where the values of the output column of a truth table defining the function are stored in the memory device and the inputs to the function are used to specify the address of a particular value in the LUT.

The use of numerous AND-OR logic or NAND combinational logic circuits is problematic in that logic circuits must be added, removed, and/or rewired whenever a new expression is to be implemented. Similarly, many PLA devices are not modifiable, or are only modifiable via physical removal of the PLA device. These methods are thus unsuitable for use in applications where the expression being implemented must be changed frequently or quickly.

The use of a data selector is problematic in that the number of data inputs to the selector is exponentially related to the number of function inputs. If one wanted to implement the simple expression A+B+C where A and B and C are each N bit values where N is 32, the data selector would need to have 3*32=96 data select inputs and $2^{(3*32)}=7.9228 \times 10^{28}$ data input applying logical expressions to values involving a large number of bits, the use of a data selector is impractical due to the extremely large number of data input lines required. The use of a memory device implementing a LUT is similarly problematic due to the large number of storage locations required. Moreover, LUTs require additional time to be initialized or "programmed" which slows down the implementation process. The implementation process is slowed even further if devices utilizing LUTs do not have an input line for every value in the table.

Thus there is a continuing need to develop new integrated circuits which are capable of implementing Boolean expressions with a minimal number of input lines and a little or no internal storage.

SUMMARY OF THE INVENTION

A programmable arithmetic and logic unit (ALU) comprising a plurality of data selectors, the data selectors having corresponding data input lines; a plurality of ALU function input lines wherein the number of ALU function input lines is equal to the number of data input lines on each of the data selectors, and each ALU function input line corresponds to one data input line on each of the data selectors; wherein each of the data input lines of each of the data selectors is connected to the corresponding data input lines of each of the other data selectors and to the corresponding ALU function input line.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 1 is a schematic view of a first embodiment of the invention.

FIG. 2 is a schematic view of a second embodiment of the invention.

DETAILED DESCRIPTION

Figure 3:
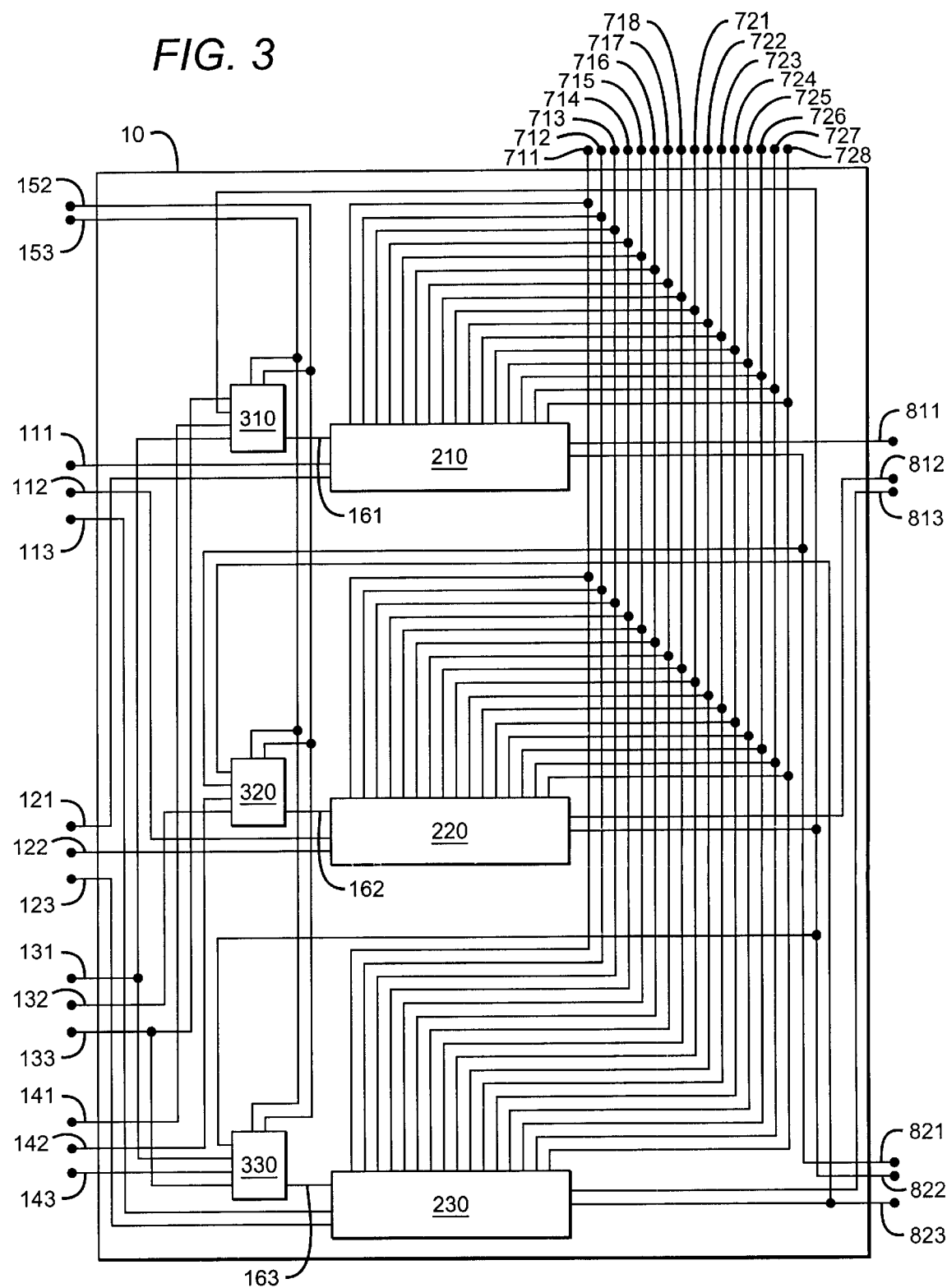
FIG. 3 is a schematic view of a third embodiment of the invention.

Referring first to FIG. 1, a programmable arithmetic logic unit (ALU) 10 can perform operations on 2 2-bit values and comprises 2 sets of 2 ALU data input lines, 111 and 112, and 121 and 122; 2 PLBs 210 and 220; 1 set of 4 ALU function input lines 711, 712, 713, and 714; and 1 set of 2 ALU output lines 811 and 812. ALU data input lines 111 and 121 are connected to the PLB data input lines of PLB 210. ALU data input lines 112 and 122 are connected to the PLB data input lines of PLB 220. ALU output line 811 is connected to the PLB output line of PLB 210. ALU output line 812 is connected to the PLB output line of PLB 220. ALU function input lines 711–714 are connected to the PLB function input lines of both PLB 210 and PLB 220. The PLBs act as data selectors such that output of each PLB (811 for PLB 210 and 812 for PLB 220) corresponds to the value on one of the 4 ALU function input lines (711, 712, 713 or 714) connected to the PLB function input lines where the particular line is selected by the values of the pair of the ALU data input lines (111 and 121 for PLB 210 and 112 and 122 for PLB 220 connected to the PLB data input lines.

It should be noted that, for the sake of simplicity, wherever ALU and PLB input and/or output lines are connected together and not to an intervening component, a single number is used to reference the connecting line which functions as an input/output for the ALU and/or for one or more PLBs.

Table 1 illustrates the relationships between the ALU function lines, the ALU data lines, and an ALU output line for PLB 210 of FIG. 1. Table 2 illustrates similar relationships for PLB 220 of FIG. 1. As shown in the tables, the values placed on ALU output lines 811 and 812 correspond to the values on the ALU function input lines, and the particular ALU function input line used to provide the output is selected by the pairs of ALU data input lines. As an example, if ALU data input line 111 has a value of 0 and ALU data input line 121 has a value of 0, then ALU output line 811 has a value equal to that of ALU function input line 711 (i.e. 0 as shown in Table 1). Similarly, if ALU data input line 112 has a value of 1 and ALU data input line 122 has a value of 1, then ALU output line 812 has a value equal to that of ALU function input line 714 (i.e. 0 as shown in Table 2). It is important to notice that the same set of function input lines is used for both PLBs.

TABLE 1

| ALU Function Input Line/Value | | ALU Data Input Lines | | ALU Output Line |
|---|---|---|---|---|
| Line | Value | 111 | 121 | 811 |
| 711 | 0 | 0 | 0 | 0 |
| 712 | 1 | 1 | 0 | 1 |
| 713 | 1 | 0 | 1 | 1 |
| 714 | 0 | 1 | 1 | 0 |

TABLE 2

| ALU Function Input Line Line/Value | | ALU Data Input Lines | | ALU Output |
|---|---|---|---|---|
| Line | Value | 112 | 122 | Line 812 |
| 711 | 0 | 0 | 0 | 0 |
| 712 | 1 | 1 | 0 | 1 |
| 713 | 1 | 0 | 1 | 1 |
| 714 | 0 | 1 | 1 | 0 |

Utilizing the same set of function input lines for every PLB in the ALU greatly reduces the number of ALU function input lines required. Instead of requiring the $2^{(2*2)}=16$ ALU function input lines which would be required if a single data selector were utilized in place of the 2 PLBs, or the 16 memory locations if a single LUT were used, only 4 ALU input lines are required. The relationship between the number of ALU data input lines and the number of ALU function input lines is no longer exponentially related to the number of bits used for the input values. Thus, for a device have X inputs of N-bits each and Y outputs, the number of ALU function input lines is simply $Y*2^X$ rather than $Y*2^{(N*X)}$.

Referring to FIG. 2, a programmable arithmetic logic unit (ALU) 10 can perform operations on 2 2-bit values and comprises 3 sets of 2 ALU data input lines, 111 and 112, and 121 and 122, 2 PLBs 210 and 220, 2 sets of 4 ALU function input lines 711–714 and 721–724, and 2 sets of 2 ALU output lines 811 and 812, and 821 and 822. As with the ALU of FIG. 1, the PLBs act as data selectors such that each of the outputs of each PLB corresponds to the value on one of the 8 ALU function input lines. The embodiment of FIG. 2 differs from that of FIG. 1 in that each of the PLBs of FIG. 2 has two sets of function input lines and two outputs. In this instance, each PLB can be viewed as comprising two data selectors with the first data selector data lines connected to ALU function input lines 711–714, the first data selector output line coupled to the first PLB output line and to ALU output line 811 or 812, the second data selector data lines connected to ALU function inputs 721–724, the second data selector output line coupled to the second PLB output line and to ALU output line 821 or 822, and the data select lines of both data selectors coupled to the PLB data input lines which are connected to a pair of ALU data input lines.

Table 3 illustrates the relationships between the ALU function lines, the ALU data lines, and an ALU output line for PLB 210 of FIG. 2. Table 2 illustrates similar relationships for the PLB 220 of FIG. 2. As shown in the tables, the values placed on ALU output lines 811, 812, 821, and 822 correspond to the values on the ALU function input lines, and the particular ALU function input line used to provide the output is selected by the values of the ALU data input lines. As an example, if ALU data input line 111 has a value of 0 and ALU data input line 121 has a value of 0, then ALU output line 811 has a value equal to that of ALU function input line 711 (i.e. 0 as shown in Table 3), and ALU output line 821 has a value equal to that of ALU function input line 721 (i.e. 0 as shown in Table 3). Similarly, if ALU data input line 112 has a value of 1 and ALU data input line 122 has a value of 0, then ALU output line 812 has a value equal to that of ALU function input line 712 (i.e. 1 as shown in Table 4), and ALU output line 822 has a value equal to that of ALU function input line 722 (i.e. 0 as shown in Table 4). The same sets of function input lines are used for both PLBs as was the case in the embodiment of FIG. 1.

TABLE 3

| ALU Function Input Lines | ALU Data Input Lines | | ALU Output Lines |
|---|---|---|---|
| (Line #/Value) | 111 | 121 | 811, 821 |
| 711/0,721/0 | 0 | 0 | 0,0 |
| 712/1,722/0 | 1 | 0 | 1,0 |
| 713/1,723/0 | 0 | 1 | 1,0 |
| 714/0,724/1 | 1 | 1 | 0,1 |

TABLE 4

| ALU Function Input Lines | ALU Data Input Lines | | ALU Output Lines |
|---|---|---|---|
| (Line #/Value) | 112 | 122 | 812, 822 |
| 711/0,721/0 | 0 | 0 | 0,0 |
| 712/1,722/0 | 1 | 0 | 1,0 |
| 713/1,723/0 | 0 | 1 | 1,0 |
| 714/0,724/1 | 1 | 1 | 0,1 |

Once again, utilizing the same set of function input lines for every PLB in the ALU greatly reduces the number of ALU function input lines required. Instead of requiring the $2*2^{(2*2)}=32$ ALU function input lines which would be required if a single data selector were utilized in place of the 2 PLBs, or the 32 memory locations if a single LUT were used, only 8 ALU function input lines are required.

Referring to FIG. 3, a programmable arithmetic logic unit (ALU) 10 can perform operations on 2 or 3 3-bit values and comprises 4 sets of 3 (111–113, 121–123, 131–133, and 141–143) and 1 set of 2 (152, 154) ALU data input lines; 3 PLBs 210, 220, and 230; 3 routers 310, 320, and 330; 2 sets of 8 ALU function input lines 711–718 and 721–728; and 2 sets of 3 ALU output lines 811–813 and 821–823. As with the ALU of FIG. 2, each of the PLBs acts as two data selectors such that each the values on the lines connected to the PLB data select inputs select two lines of the PLB function inputs so that the outputs of the PLBs match the values on the selected function input lines. The embodiment of FIG. 3 differs from that of FIG. 2 in that the embodiment of FIG. 3 incorporates one router for each PLB to provide control over the source of one of the PLB inputs.

As is shown in Tables 5, 6, and 7, inputs 152 and 154 control the routers 310, 320, and 330 in that, depending on the values of inputs 152 and 154, each router selects one of four inputs to connect to one PLB data input. As an example, placing logic values of 0 and 0 on lines 152 and 154 may result in ALU data input line 132 being connected, via router 320 and line 162, to a PLB data input line of PLB 220. Similarly, placing logic values of 0 and 1 on lines 152 and 154 may result in ALU data input line 142 being connected, via router 320 and line 162, to a PLB data input line of PLB 220. As yet another example, placing logic values of 1 and 0 on lines 152 and 154 may result in PLB/ALU data output line 823 being connected to a PLB data input line of PLB 220. Similarly, placing logic values of 1 and 1 on lines 152 and 154 may result in PLB/ALU data output line 821 being connected to a PLB data input line of PLB 220.

TABLE 5

Router 310

| Router Alternate Source Select Line 152 | Router Direction Select Line 154 | Router Output Line 161 |
|---|---|---|
| 0 | 0 | Value of 131 |
| 0 | 1 | Value of 141 |
| 1 | 0 | Value of 822 |
| 1 | 1 | Value of 133 (as a "Carry In") |

TABLE 6

Router 320

| Router Alternate Source Select Line 152 | Router Direction Select Line 154 | Router Output Line 162 |
|---|---|---|
| 0 | 0 | Value of 132 |
| 0 | 1 | Value of 142 |
| 1 | 0 | Value of 823 |
| 1 | 1 | Value of 821 |

TABLE 7

Router 330

| Router Alternate Source Select Line 152 | Router Direction Select Line 154 | Router Output Line 163 |
|---|---|---|
| 0 | 0 | Value of 133 |
| 0 | 1 | Value of 143 |
| 1 | 0 | Value of 131 (as a "Carry In") |
| 1 | 1 | Value of 822 |

Table 8 illustrates the relationships between the ALU function lines, the ALU data lines, and an ALU output line for PLB 210 of FIG. 3. (The values shown for Tables 8, 9, and 10 are based on the assumption that ALU data input lines 131, 132, and 133 are being used to provide the third input line to each of the PLBs.) Table 9 illustrates similar relationships for the PLB 220 of FIG. 3 and Table 10 illustrates similar relationships for the PLB 230 of FIG. 3. As shown in the tables, the values placed on ALU output lines 811–813 and 821–823 correspond to the values on the ALU function input lines, and the particular ALU function input line used to provide the output is selected by the values of the ALU data input lines. The same sets of function input lines are used for all three PLBs in a manner similar to that of FIGS. 1 and 2.

TABLE 8

| ALU Function Input Lines | ALU Data Input Lines | | | ALU Output Lines |
|---|---|---|---|---|
| (Line #/Value) | 111 | 121 | 131 | 811, 821 |
| 711/0,721/0 | 0 | 0 | 0 | 0,0 |
| 712/1,722/0 | 1 | 0 | 0 | 1,0 |
| 713/1,723/0 | 0 | 1 | 0 | 1,0 |
| 714/0,724/1 | 1 | 1 | 0 | 0,1 |
| 715/1,725/0 | 0 | 0 | 1 | 1,0 |
| 716/0,726/1 | 1 | 0 | 1 | 0,1 |
| 717/0,727/1 | 0 | 1 | 1 | 0,1 |
| 718/1,728/1 | 1 | 1 | 1 | 1,1 |

TABLE 9

| ALU Function Input Lines | ALU Data Input Lines | | | ALU Output Lines |
|---|---|---|---|---|
| (Line #/Value) | 112 | 122 | 132 | 812, 822 |
| 711/0,721/0 | 0 | 0 | 0 | 0,0 |
| 712/1,722/0 | 1 | 0 | 0 | 1,0 |
| 713/1,723/0 | 0 | 1 | 0 | 1,0 |
| 714/0,724/1 | 1 | 1 | 0 | 0,1 |
| 715/1,725/0 | 0 | 0 | 1 | 1,0 |
| 716/0,726/1 | 1 | 0 | 1 | 0,1 |
| 717/0,727/1 | 0 | 1 | 1 | 0,1 |
| 718/1,728/1 | 1 | 1 | 1 | 1,1 |

TABLE 10

| ALU Function Input Lines | ALU Data Input Lines | | | ALU Output Lines |
|---|---|---|---|---|
| (Line #/Value) | 113 | 123 | 133 | 813, 823 |
| 711/0,721/0 | 0 | 0 | 0 | 0,0 |
| 712/1,722/0 | 1 | 0 | 0 | 1,0 |
| 713/1,723/0 | 0 | 1 | 0 | 1,0 |
| 714/0,724/1 | 1 | 1 | 0 | 0,1 |
| 715/1,725/0 | 0 | 0 | 1 | 1,0 |
| 716/0,726/1 | 1 | 0 | 1 | 0,1 |
| 717/0,727/1 | 0 | 1 | 1 | 0,1 |
| 718/1,728/1 | 1 | 1 | 1 | 1,1 |

Yet again, utilizing the same set of function input lines for every PLB in the ALU greatly reduces the number of ALU function input lines required. Instead of requiring the $2*2^{(3*3)}=1024$ ALU function input lines which would be required if a single data selector were utilized in place of the 3 PLBs, or the 1024 memory locations if a single LUT were used, only 16 ALU function input lines are required.

Figure 4:
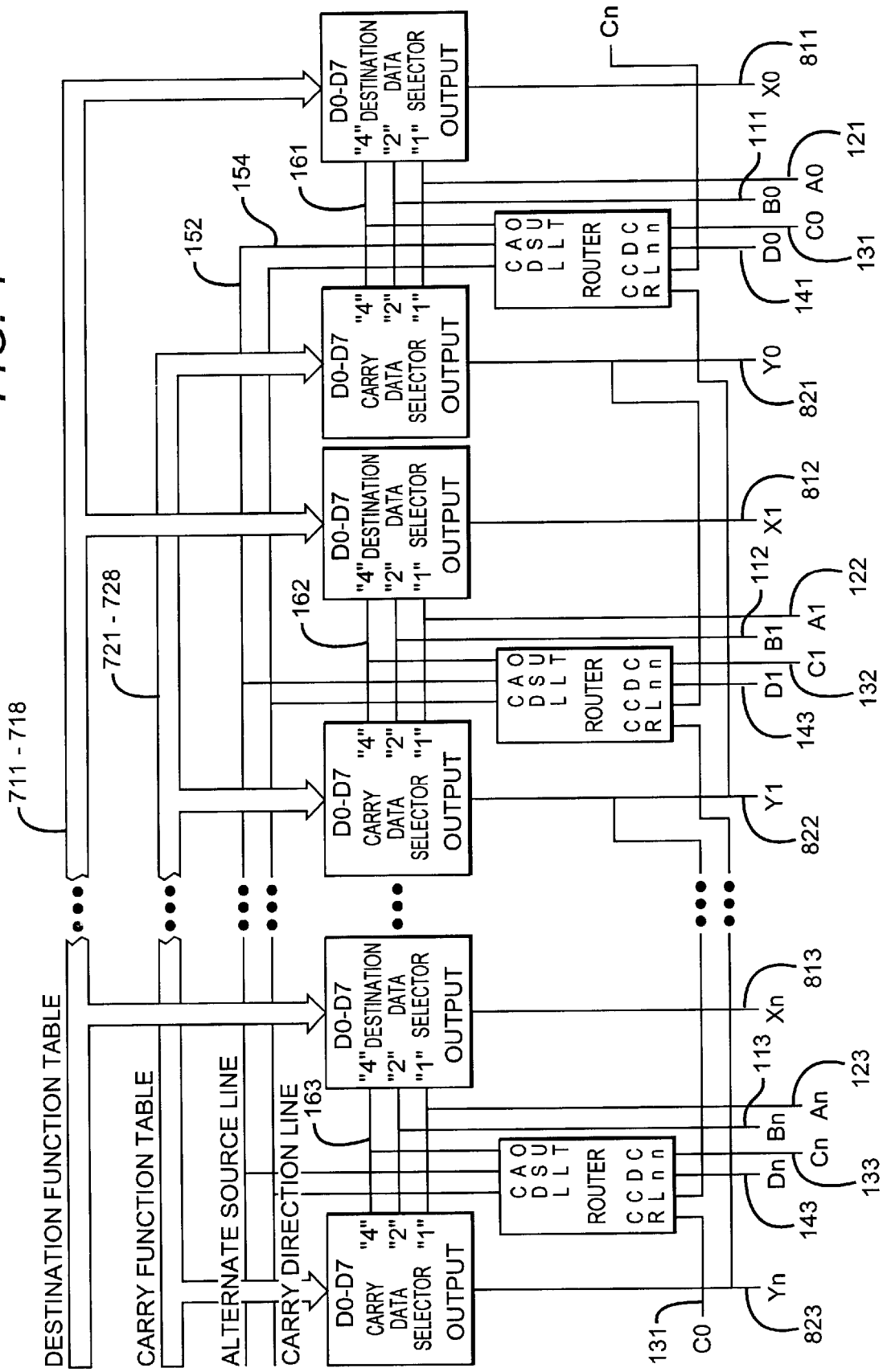
FIG. 4 is a schematic view illustrating a how each PLB of the embodiment of FIG. 3 can have two data selectors and a router.
Figure 5:
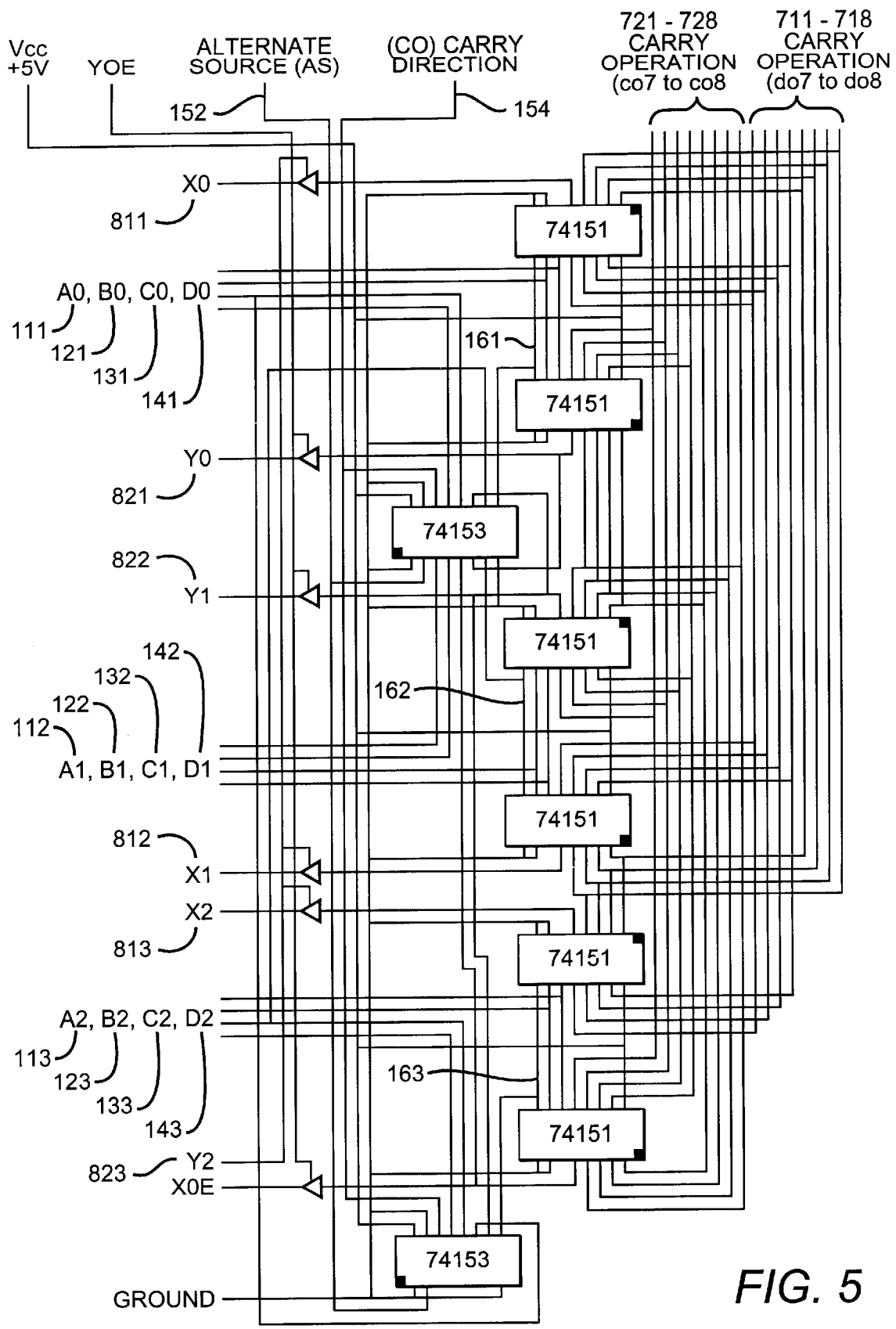
FIG. 5 is a schematic view of a fourth embodiment of the invention utilizing 74151 and 74153 ICs.

Referring to FIGS. 4 and 5, the embodiment of FIG. 3 can be implemented using 2 standard 74151 data selectors for each PLB. In such an embodiment, the data selector data inputs would correspond to the two sets of eight ALU/PLB function input lines (711–718 and 721–728), two of the three data selector data-select inputs of each data selector would correspond to two of the four sets of three ALU/PLB data input lines (111–113 and 121–133), and the data selector output lines would correspond to the ALU/PLB data output lines (811–813 and 821–823). Similarly, each of the routers can be implemented using a single 74153 data selector for each router with ALU data input lines 152 and 154 acting as the data-select inputs, the data selector output line of each router acting as the third data-select input for each pair of data selectors being used to implement a PLB, and the remaining ALU/PLB data input lines (831–833 and 841–843) being used as data selector data inputs. Depending on the values of 152 and 154, the data selector output lines (161–163) will carry one of the following sets of values: (131,132,133), (141,142,143), (133,821,822), or (822,823, 131).

Figure 6:
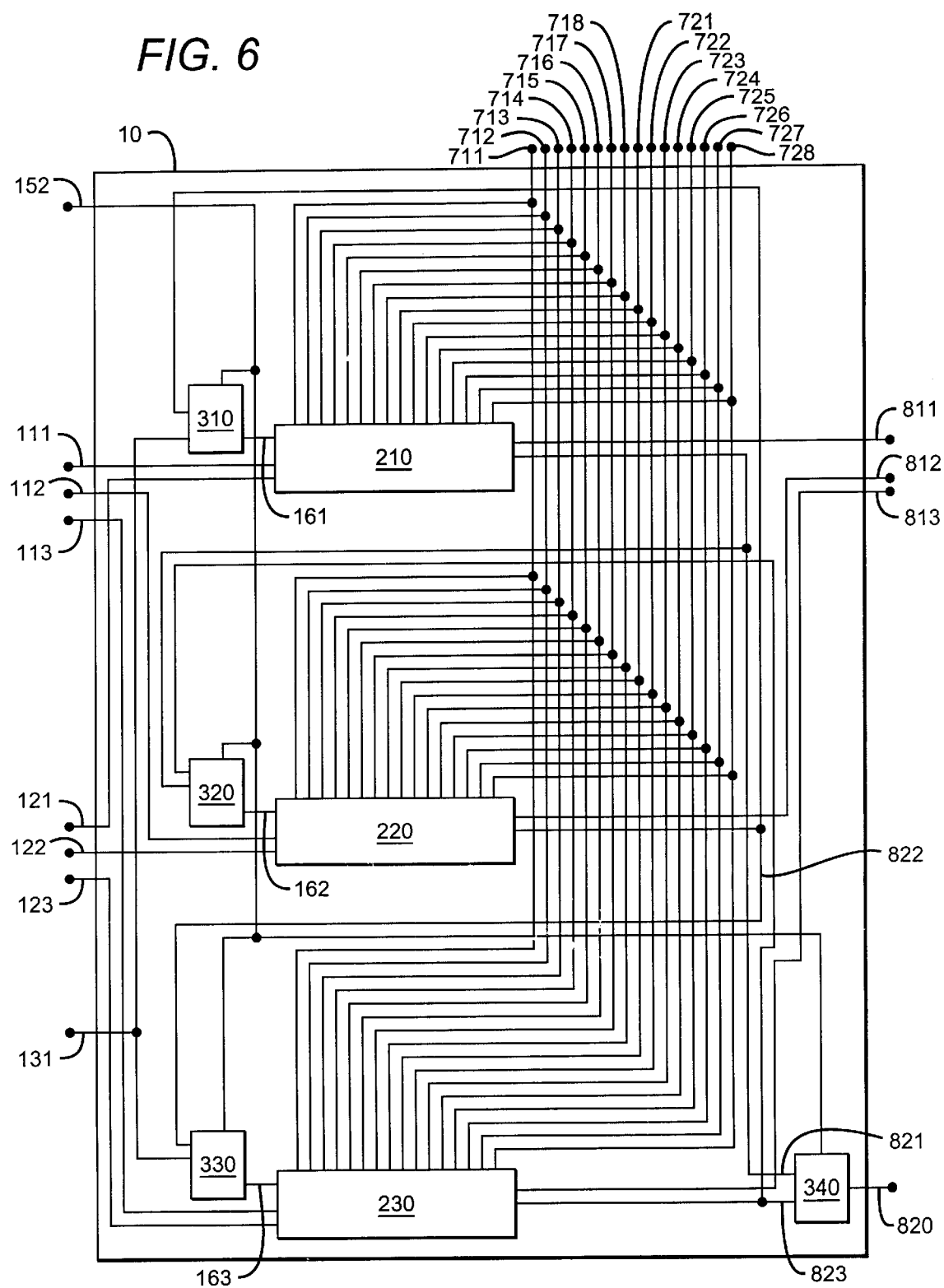
FIG. 6 is a schematic view of a fourth embodiment of the invention.

Referring to FIG. 6, a variation of the programmable arithmetic logic unit (ALU) 10 of FIG. 3 may be modified so as to reduce the number of ALU data input lines, router source select lines, and ALU output lines. In FIG. 6, input lines 141–143 and 132 have been removed as has router input select line 154. Additionally, the ALU output lines (821–823) are no longer externally accessible but are only routed internally, and are replaced by ALU output line 820. In the embodiment of FIG. 6, one output line of each PLB can be treated as a "Carry" output and router source select line 152 can be used to determine the direction in which the carry output is shifted. Thus, for a value of 0 on line 152, ALU input line 131 acts as a carry input to PLB 230, carry output 823 of PLB 230 acts as a carry input to PLB 220, carry output 822 of PLB 220 acts as a carry input to PLB 210, and ALU output line 820 will reflect the carry output value of PLB 210 by way of selection via router 340 and input line 152. Similarly, for a value of 1 on line 152, ALU input line 131 acts as a carry input to PLB 210, carry output 821 of PLB 210 acts as a carry input to PLB 220, carry output 822 of PLB 220 acts as a carry input to PLB 230, and ALU output line 820 will reflect the carry output value of PLB 230 by way of selection via router 340 and input line 152.

As with the embodiments of FIGS. 1–3, utilizing the same set of function input lines for every PLB in the ALU greatly reduces the number of ALU function input lines required.

Referring again to FIGS. 1–6, it can be seen that a programmable arithmetic and logic unit (ALU) 10, as contemplated herein, may comprise a plurality of data selectors having corresponding data inputs lines (210 and 220 in FIGS. 1 and 2, 210–230 in FIG. 3); a plurality of ALU function input lines (711–714 in FIG. 1, 711–714 and 721–724 in FIG. 2, and 711–718 and 721–728 in FIG. 3); wherein the number of ALU function input lines is equal to the number of data input lines on each of the data selectors (4 in FIG. 1, 8 in FIG. 2, and 16 in FIG. 3), and each ALU function input line corresponds to one data input line on each of the data selectors (711 corresponds to the first data input line of each data selector/PLB, 712 corresponds to the second data input line of each data selector/PLB, etc.); wherein each of the data input lines of each of the data selectors is connected to the corresponding data input lines of each of the other data selectors and to the corresponding ALU function input line (ALU data input line 711 is connected to the first data input line of each data selector/ PLB, ALU data input line 712 is connected to the second data input line of each data selector/PLB, etc.).

It is preferred that there be a one to one correspondence between the number of PLBs and the number of bits in each of the values on which the ALU operates. As contemplated herein, any number of PLBs may be used as long as there are at least two PLBs. ALUs having 4, 8, 16, 32, or 64 PLBs are considered especially useful. As newer devices capable of performing operations on values having larger numbers of bits are developed, ALUs according the claimed invention having greater than 64 PLBs will likely increase in usefulness. For embodiments in which the number of bits in each of the values on which the ALU operates are not equal, it is preferred that the number of PLBs is equal to the maximum number of lines in each of sets of ALU data input lines.

It is also preferred that the number of lines in the first set of ALU data input lines (111–112 in FIGS. 1 and 2, and 111–113 in FIG. 3) and the number of lines in the second set of ALU data input lines (121–122 in FIGS. 1 and 2, and 121–123 in FIG. 3) are equal. Also, is preferred that the number of lines in the first set of ALU output lines (811–812 in FIGS. 1 and 2, and 811–813 in FIG. 3) be equal to the number of lines in the first and second sets of ALU data input lines. As with the number of PLBs, sets of ALU input and output lines having 4, 8, 16, 32, 64, or other power of 2 lines may be particularly useful.

In some embodiments which incorporate a third set of ALU data input lines and a second set of ALU output lines, it may be beneficial to have the number of lines in each of the sets equal. Various embodiments might then have a single line input and output which can be used to implement carrying or borrowing between ALUs or may even have a greater number of lines than the first two sets of ALU data input lines. As shown in FIG. 3, some embodiments may have a fourth set of ALU data input lines and may have each line of the fourth set of data input lines coupled to a router.

From the foregoing paragraphs, it can be seen that an ALU as claimed herein may, referring again to FIG. 3, comprise: first, second, and third sets of ALU data input lines (111–113, 121–123, 131–133, and 141–143); at least first and second sets of ALU result output lines (811–813 and 821–823); at least first and second sets of ALU function input lines (711–718 and 721–728); at least first and second PLBs (210, 220, and 230), each PLB having at least first, second and third PLB data input lines (111, 121, and 161 for 210; 112, 122, and 162 for 220; and 113, 123 and 163 for 230), at least first and second sets of PLB function input lines (711–718 and 721–728), at least first and second PLB result output lines (811–813 and 821–823), wherein every combination of binary values on the first, second, and third PLB data input lines identifies a single corresponding PLB function line in each of the at least first and second sets of PLB function input lines, and placing binary values on the first, second, and third PLB data input lines results in the value of the corresponding PLB function line of the first set of PLB function input lines being placed on the first PLB result output line, and also results in the value of the corresponding PLB function line of the second set of PLB function input lines being placed on the second PLB result output line; at least first and second routers (210, 220, and 230), each router is associated with a PLB and is electrically coupled to the second PLB result output line (821, 822, or 823) of a non-associated PLB, and is electrically coupled to the third PLB data input line (161, 162, or 163) of the associated PLB such that values placed on the second output line of the non-associated PLB may result in the same value on the third PLB data input line of the associated PLB; wherein each line of the first set of ALU data input lines (111–113) is electrically coupled to the first PLB data input line of a PLB, each line of the second set of ALU data input lines (121–123) is electrically coupled to the second PLB data input line of a PLB, each line of the first set of ALU result output lines (811–813) is electrically coupled to the first PLB result output line of a PLB, each line of the second set of ALU result output lines (821–823) is electrically coupled to the second PLB result output line of a PLB, each line of the first set of ALU function input lines (711–718) is electrically coupled to the first set of PLB function input lines of all the PLBs, each line of the second set of ALU function input lines (721–728) is electrically coupled to the second set of PLB function input lines of all the PLBs, each line of the third set of ALU data input lines (131–133) is electrically coupled to a router (330, 320, or 310).

From the foregoing paragraphs, it can also be seen that an ALU as claimed herein may be capable of performing arithmetic and logical operations on R inputs to produce Y outputs where R and Y are at least 2, and each input has N bits where N is at least 2. FIG. 3 will be referred to while describing such an ALU for the portions of FIG. 3 which correspond to such an ALU. Such an ALU may comprise R sets (in FIG. 3, R=4) of ALU data input lines (111–113, 121–123, and 131–133) wherein the R sets have N (in FIG. 3, N=3) ALU data input lines; $Y*2^X$ ALU function input lines (in FIG. 3, $Y*2^X=2*2^3=16$), wherein X is at least 2 and less than or equal to R; and two sets of ALU result output lines wherein a first set of the at least two sets of ALU result output lines has at least N ALU result output lines (N=3 in FIG. 3) and a second set of the at least two sets of ALU result output lines has at least one carry ALU result output line; N PLBs (N=3 in FIG. 3), wherein each PLB having X PLB data input lines (X=3 in FIG. 3), $Y*2^X$ PLB function input lines ($Y*2^X=16$ in FIG. 3) and first and second PLB result output lines; and wherein every combination of binary values on the X PLB data input lines identifies first and second corresponding PLB function input lines of the $2^X$ PLB function input lines, and placing binary values on the X PLB data input lines results in the value of the first corresponding PLB function input line being placed on the first PLB result output line, and the value of the second corresponding PLB function input line being placed on the second PLB result output line; and N routers (N=3 in FIG. 3), each router having first and second router input lines, a router control input line (152 and 154 in FIG. 3), and a router output line (161, 162, 163 in FIG. 3), wherein each router is associated with a PLB (310 is associated with 210, 320 is associated with 220, and 330 is associated with 230 in FIG. 3) and the first router input line of a first router (310) of the N routers (310, 320, 330 in FIG. 3) is electrically coupled to the second PLB result output line (822) of a first non-associated PLB (220), and the second router input line of the first router (310) of the N routers is electrically coupled to the corresponding carry ALU data input line of the R sets of ALU data input lines, the router output line of the first router (310) of the N routers is electrically coupled to the Xth PLB data input line (161) of the associated PLB (210), the first router input line of a second router (330) of the N routers (310, 320, 330) is electrically coupled to the corresponding carry ALU data input line of the R sets of ALU data input lines, and the second router input line of the second router (330) of the N routers (310, 320, 330) is electrically coupled to the second PLB result output line (822) of a first non-associated PLB (220), the router output line of the second router (330) of the N routers is electrically coupled to the Xth PLB data input line (163) of the associated PLB (230), the first router input line of each of the N routers (320), excluding the first and second routers, is electrically coupled to the second PLB result output line of a first non-associated PLB (230), and the second router input line of each of the N routers (320), excluding the first and second routers, is electrically coupled to the second PLB result output line of a second non-associated PLB (210), the router output line of each of the N routers (320), excluding the first and second routers, is electrically coupled to the Xth PLB data input line (162) of the associated PLB, wherein one ALU data input line of each of the X-1 sets (X-1=2 in FIG. 3) of the R sets of ALU data input lines is electrically coupled to one of the X PLB data input lines of one of the N PLBs (111 and 121 coupled to 210, 112 and 122 coupled to 220, and 113 and 123 coupled to 230) and the ALU data input lines of the R sets of ALU data input lines, excluding the (X-1) sets of the R sets of ALU data input lines, (131–133 and 141–143 in FIG. 3) are electrically coupled to data inputs of the router associated with the corresponding PLB of the N PLBs (131 and 141 are coupled to 310; 132 and 142 are coupled to 320; 133 and 143 are coupled to 330), each ALU result output line of the first set of ALU result output lines (811, 812, and 813) is electrically coupled to the first PLB result output line of one of the N PLBs (811 coupled to 210, 812 coupled to 220, 813 coupled to 230), each ALU function input line of the $Y*2^X$ ALU function input lines is electrically coupled to one of the $Y*2^X$ PLB function input lines of each of the N PLBs (711–718 and 721–728 all coupled to 210, 220, and 230).

As previously discussed, the number of bits in the values operated on may be any number greater than or equal to two such that N is one of 2,3,4,5,6,7,8,9,10,11,12,13,14,15,16, or N is greater than 16. Similarly, the number of values operated on by different embodiments may vary such that X is one of 2, 3, 4, 5, 6, 7, 8, 9, and 10, or X is greater than 10.

Thus, specific embodiments and applications of programmable ALUs have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. A programmable arithmetic and logic unit (ALU) comprising:
    at least first, second, and third sets of ALU data input lines;
    at least first and second sets of ALU result output lines;
    at least first and second sets of ALU function input lines;
    at least first and second programmable logic blocks (PLBs), each PLB of the at least first and second PLBs having
        at least first, second and third PLB data input lines,
        at least first and second sets of PLB function input lines, and
        at least first and second PLB result output lines,
    wherein every combination of binary values on the first, second, and third PLB data input lines identifies a single corresponding PLB function line in each of the at least first and second sets of PLB function input lines, and placing binary values on the first, second, and third PLB data input lines results in the value of the corresponding PLB function line of the first set of PLB function input lines being placed on the first PLB result output line, and also results in the value of the corresponding PLB function line of the second set of PLB function input lines being placed on the second PLB result output line; and
    at least first and second routers,
        each router of the at least first and second routers is associated with a PLB of the at least first and second PLBs and is electrically coupled to the second PLB result output line of a non-associated PLB of the at least first and second PLBs, and is electrically coupled to the third PLB data input line of the associated PLB such that values placed on the second output line of the non-associated PLB may result in the same value on the third PLB data input line of the associated PLB;
        wherein
        each line of the first set of ALU data input lines is electrically coupled to the first PLB data input line of a PLB of the at least first and second PLBs, each line of the second set of ALU data input lines is electrically coupled to the second PLB data input line of a PLB of the at least first and second PLBs, each line of the first set of ALU result output lines is electrically coupled to the first PLB result output line of a PLB of the at least first and second PLBs, each line of the second set of ALU result output lines is electrically coupled to the second PLB result output line of a PLB of the at least first and second PLBs, each line of the first set of ALU function input lines is electrically coupled to the first set of PLB function input lines of all of the at least first and second PLBs, each line of the second set of ALU function input lines is electrically coupled to the second set of PLB function input lines of all of the at least first and second PLBs, each line of the third set of ALU data input lines is electrically coupled to a router of the at least first and second routers.

2. The programmable arithmetic and logic unit of claim 1 wherein the third set of ALU data input lines consists of a single line.

3. The programmable arithmetic and logic unit of claim 1 wherein the number of PLBs is one of 4, 8, 16, 32, and 64.

4. The programmable arithmetic and logic unit of claim 1 wherein the number of PLBs is greater than 64.

5. The programmable arithmetic and logic unit of claim 1 wherein the number of lines in the first set of ALU data input lines and the number of lines in the second set of ALU data input lines are equal.

6. The programmable arithmetic and logic unit of claim 1 wherein the number of lines in the first set of ALU data input lines, the number of lines in the second set of ALU data input lines, and the number of lines in the first set of ALU result output lines are equal.

7. The programmable arithmetic and logic unit of claim 1 wherein the number of lines in the third set of ALU data input lines and the number of lines in the second set of ALU result output lines are equal.

8. The programmable arithmetic and logic unit of claim 1 wherein there is only one line in the second set of ALU result output lines.

9. The programmable arithmetic and logic unit of claim 1 wherein there are eight lines in each set of the at least first and second sets of PLB function input lines.

10. The programmable arithmetic and logic unit of claim 1 wherein the ALU comprises a fourth set of data input lines and each line of the fourth set of data input lines is coupled to a router.

11. The programmable arithmetic and logic unit of claim 1 wherein the number of PLBs is equal to the maximum number of lines in each of the at least first, second, and third sets of ALU data input lines.

12. A programmable arithmetic and logic unit (ALU) capable of performing arithmetic and logical operations on R inputs to produce Y outputs where R and Y are at least 2, and each of R-1 inputs has N bits where N is at least 2, the ALU having:

R sets of ALU data input lines wherein R-1 of the R sets has at least N ALU data input lines and the remaining set has at least one ALU data input line where each of the at least one ALU data input line is a carry line;

$Y*2^X$ ALU function input lines, wherein X is an integer less than or equal to R, and X is at least 2;

Y sets of ALU result output lines wherein a first set of the Y sets of ALU result output lines has at least N ALU result output lines and a second set of the Y sets of ALU result output lines has at least one ALU result output line;

N programmable logic blocks (PLBs),
wherein each PLB has
X PLB data input lines,
$Y*2^X$ PLB function input lines, and
Y PLB result output lines, the Y PLB result output lines having at least a first result output line and a second result output line; and
wherein every combination of binary values on the X PLB data input lines identifies Y corresponding PLB function input lines of the $2^X$ PLB function input lines, and placing binary values on the X PLB data input lines results in the values of the corresponding Y PLB function input lines being placed on the Y PLB result output lines; and N routers,
each router having at least first and second router input lines, and a router output line,
wherein each router is associated with a PLB and
the first router input line of a first router of the N routers is electrically coupled to the second PLB result output line of a first non-associated PLB, and the second router input line of the first router of the N routers is electrically coupled to a carry line, the router output line of the first router of the N routers electrically coupled to a PLB data input line of the associated PLB,
the first router input line of a second router of the N routers is electrically coupled to a carry line, and the second router input line of the second router of the N routers is electrically coupled to the second PLB result output line of a first non-associated PLB, the router output line of the second router of the N routers electrically coupled to a PLB data input line of the associated PLB,
the first router input line of each of the N routers, excluding the first and second routers, is electrically coupled to the second PLB result output line of a first non-associated PLB, and the second router input line of each of the N routers, excluding the first and second routers, is electrically coupled to the second PLB result output line of a second non-associated PLB, the router output line of the each of the N routers, excluding the first and second routers, is electrically coupled to a PLB data input line of the associated PLB;

wherein
one ALU data input line of each of X-1 sets of the R sets of ALU data input lines having at least N ALU data input lines is electrically coupled to one of the X PLB data input lines of one of the N PLBs,
each ALU result output line of the first set of ALU result output lines is electrically coupled to the first PLB result output line of one of the N PLBs,
each ALU function input line of the $Y*2^X$ ALU function input lines is coupled to one of the $Y*2^X$ PLB function input line of each of the N PLBs.

13. The ALU of claim 12 wherein N is one of 2,3,4,5,6, 7,8,9,10,11,12,13,14,15, and 16.

14. The ALU of claim 12 wherein N is greater than 16.

15. The ALU of claim 12 wherein X is one of 2, 3, 4, 5, 6, 7, 8, 9, and 10.

16. The ALU of claim 12 wherein X is greater than 10.

* * * * *